United States Patent
Seo et al.

(10) Patent No.: US 9,473,232 B2
(45) Date of Patent: *Oct. 18, 2016

(54) METHOD FOR TRANSMITTING/RECEIVING DATA BETWEEN A RELAY AND A BASE STATION

(71) Applicant: LG ELECTRONICS INC., Seoul (KR)

(72) Inventors: Han-Byul Seo, Anyang (KR); Ki-Jun Kim, Anyang (KR); Hak-Seong Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 14/496,892

(22) Filed: Sep. 25, 2014

(65) Prior Publication Data

US 2015/0009890 A1    Jan. 8, 2015

Related U.S. Application Data

(63) Continuation of application No. 13/201,471, filed as application No. PCT/KR2010/000989 on Feb. 17, 2010, now Pat. No. 8,879,469.

(60) Provisional application No. 61/153,286, filed on Feb.
(Continued)

(51) Int. Cl.
*H04B 7/15* (2006.01)
*H04B 7/26* (2006.01)
(Continued)

(52) U.S. Cl.
CPC .............. *H04B 7/15* (2013.01); *H04B 7/2606* (2013.01); *H04L 1/16* (2013.01); *H04L 1/1812* (2013.01); *H04L 1/1822* (2013.01); *H04W 16/26* (2013.01); *H04L 2001/0097* (2013.01)

(58) Field of Classification Search
CPC .. H04W 84/047; H04W 88/04; H04B 7/155; H04B 7/2606; H04B 7/15542
See application file for complete search history.

(56) References Cited

U.S. PATENT DOCUMENTS 7,751,776 B2   7/2010 Fujita
8,090,310 B2   1/2012 Suga
(Continued)

FOREIGN PATENT DOCUMENTS

CN   101047431 A   10/2007
CN   101127665 A    2/2008
CN   101179320 A    5/2008

OTHER PUBLICATIONS

3GPP TSG RAN WG1 Meeting #56, R1-090827, "Summary and proposal of relay frame structure", Huawei, Agenda Item 12.5, pp. 1-6, Feb. 9-13, 2009.
(Continued)

*Primary Examiner* — Jung Park
(74) *Attorney, Agent, or Firm* — Birch, Stewart, Kolasch & Birch, LLP

(57) ABSTRACT

A method and a relay node are described for transmitting and receiving data. The relay node receives a downlink data in a subframe n−k from a base station. The subframe n−k is configured as a multicast broadcast single frequency network (MBSFN) subframe by the relay node. The relay node transmits to the base station, in response to receiving the downlink data in the subframe n−k, an acknowledgement (ACK)/negative acknowledgement (NACK) in an uplink subframe n, where n is an index number of the uplink subframe for transmitting the ACK/NACK. A value of n is associated with a parameter indicating subframe configuration related with at least one hybrid automatic repeat request (HARM) process between the relay node and the base station. The value of k is equal to or greater than 4.

6 Claims, 16 Drawing Sheets

Related U.S. Application Data 17, 2009, provisional application No. 61/156,541, filed on Mar. 2, 2009, provisional application No. 61/219,384, filed on Jun. 23, 2009, provisional application No. 61/228,131, filed on Jul. 23, 2009, provisional application No. 61/242,778, filed on Sep. 15, 2009.

(51) Int. Cl.
*H04L 1/18* (2006.01)
*H04L 1/16* (2006.01)
*H04W 16/26* (2009.01)
*H04L 1/00* (2006.01)

(56) References Cited

U.S. PATENT DOCUMENTS

| | | |
|---|---|---|
| 2008/0108304 A1 | 5/2008 | Suga |
| 2008/0160912 A1 | 7/2008 | Kim et al. |
| 2008/0247354 A1 | 10/2008 | Hsieh et al. |
| 2009/0181689 A1 | 7/2009 | Lee et al. |
| 2009/0201900 A1 | 8/2009 | Suga |
| 2009/0217119 A1 | 8/2009 | Zhang et al. |
| 2010/0080166 A1 | 4/2010 | Palanki et al. |
| 2010/0110964 A1 | 5/2010 | Love et al. |
| 2010/0304665 A1 | 12/2010 | Higuchi |
| 2012/0263135 A1 | 10/2012 | Ahmadi |

OTHER PUBLICATIONS

Ericsson, "Efficient support of relays through MBSFN subframes", TSG-RAN WG1 #55, Prague, Czech Republic, R1-084357, Nov. 10-14, 2008, 3 pages.

Motorola, "LTE—A Relay support via existing MBSFN signaling (10ms vs. 8ms periodicity)", 3GPP TSG RAN WG1 Meeting #55, Prague, Czech Republic, R1-084535, Nov. 10-14, 2008, 2 pages.

Nortel, "Control Channel and Data Channel Design for Relay Link in LTE-Advanced", 3GPP TSG-RAN Working Group 1 Meeting #56, Athens, Greece, R1-090753, Feb. 9-13, 2009, 9 pages.

Qualcomm Europe, "Comparing Relay Support with MBSFN and Blank Subframes", 3GPP TSG RAN WG1 #55 Meeting, Prague, Czech Republic, R1-084515, Nov. 10-14, 2008, 4 pages.

METHOD FOR TRANSMITTING/RECEIVING DATA BETWEEN A RELAY AND A BASE STATION

CROSS-REFERENCE TO RELATED APPLICATIONS

This application is a Continuation of U.S. application Ser. No. 13/201,471 filed on Aug. 15, 2011 (now U.S. Pat. No. 8,879,469 issued on Nov. 4, 2014), which is the National Phase of PCT/KR2010/000989 filed on Feb. 17, 2010, which claims priority under 35 USC 119(e) to U.S. Provisional Application Nos. 61/153,286 filed on Feb. 17, 2009, 61/156,541 filed on Mar. 2, 2009, 61/219,384 filed on Jun. 23, 2009, 61/228,131 filed on Jul. 23, 2009 and 61/242,778 filed on Sep. 15, 2009. The contents of all of these applications are hereby incorporated by reference as fully set forth herein in their entirety.

BACKGROUND OF THE INVENTION

1. Field of the Invention

The present invention relates to radio communications, and more particularly, to a method for transmitting/receiving data between a relay station and a base station.

2. Discussion of the Related Art

A radio communications system may be largely categorized into an FDD (Frequency Division Duplex) scheme and a TDD (Time Division Duplex) scheme.

According to the FDD scheme, an uplink transmission and a downlink transmission are performed through different frequency bands. According to the TDD scheme, an uplink transmission and a downlink transmission are performed through the same frequency band and at different times. According to the TDD scheme, channel responses are substantially reciprocal to each other. This means that a downlink channel response and an uplink channel response are almost the same in a given frequency region. Accordingly, in a TDD-based radio communications system, a downlink channel response can be acquired from an uplink channel response.

According to the TDD method, an entire frequency band undergoes time division into an uplink transmission and a downlink transmission. Therefore, a downlink transmission by a base station (BS) and an uplink transmission by a mobile station (MS) cannot be simultaneously performed. In a TDD system where an uplink transmission and a downlink transmission are differentiated from each other in the unit of subframes, an uplink transmission and a downlink transmission are performed on different subframes.

In order to extend the service coverage of the BS, there have been proposed various methods.

One of the various methods is to introduce a relay station (RS) to the radio communications system. The RS is operated as an intermediary between the BS and the MS (or between two MSs and between MS/BS and another RS). More concretely, the RS allows data to be transferred between the BS and the MS far therefrom through two hops or multi hops, not through a single link for direct transfer. This RS may extend the service coverage of the BS, and may enhance a cell boundary performance. Furthermore, the RS may enhance a cell throughput.

The RS was firstly developed from a time division duplex (TDD) radio communications system such as Mobile WiMAX (e.g., IEEE 802.16j/m).

In order to enhance the performance, a Frequency Division Duplex (FDD) radio communications system has started to research about the introduction of a relay station. The FDD radio communications system may include an FDD-based 3GPP (Generation Project Partnership) LTE (Long Term Evolution) system, or a Mobile WiMAX system for supporting FDD, etc.

FIG. 1 illustrates a radio communications system using a relay station.

As shown, the radio communications system includes one or more base stations (BS) 21, 22 and 23 (hereinafter, will be referred to as '20').

Each base station 21, 22 and 23 provides a communications service to a specific geographical area (cell) 21*a*, 22*a* and 23*a*. The cell may be divided into a plurality of areas (sectors). One base station may include one or more cells.

The base stations 21, 22 and 23 indicate fixed stations communicating with terminals 11, 12 and 13 (hereinafter, will be referred to as '10'), and may be called eNB (evolved-NodeB), BTS (Base Transceiver System), Access Point, AN (Access Network), etc.

Hereinafter, a downlink (DL) indicates a communication to a terminal from a base station, and an uplink (UL) indicates a communication from a terminal to a base station. In the DL, a transmitter may be part of a base station, and a receiver may be part of a terminal. In the UL, a transmitter may be part of a terminal, and a receiver may be part of a base station.

In uplink transmission, the terminal 11 is operated as a source station, and transmits data to the base station serving as a destination station. In downlink transmission, the base station 21 is operated as a source station, and transmits data to the terminal 11 serving as a destination station.

As shown, the radio communications system may include one or more relay stations 31, 32 and 33 (hereinafter, will be referred to as '30').

As shown, the relay stations 31, 32 and 33 are positioned on an outer periphery area or a shadow area of a cell, and relays data between the base station and the terminal. Here, the base station performs functions such as connectivity, management, control and resource allocations between the relay station and the terminal.

Referring to FIG. 2, the base station performs a communication with the terminal through the relay station.

As shown, the relay station 31 relays the UL and the DL.

In UL transmission, the terminal 11 serving as a source station transmits UL data to a destination station, i.e., the base station 21 and the relay station 31. Then, the relay station 31 relays the UL data of the terminal 11 to the base station 21.

In DL transmission, the base station 21 serving as a source station transmits DL data to a destination source, i.e., the terminal 11 and the relay station 31. Then, the relay station 31 relays data from the source station (the base station 21) to the destination station (the terminal 11).

As shown, the relay station may be implemented in one or plurality in number. That is, the relay stations 32 and 33 may exist between the base station and the terminal 12.

The relay station may adopt a relaying scheme such as an AF (amplify and forward) scheme and a DF (decode and forward) scheme.

Data transferred between the base station 21 and the relay station 31 is called 'backhaul' data. The backhaul data may be data by the terminal, or may be data controlled by the base station 21 between the base station and the relay station 31.

In order to prevent the terminal from receiving the backhaul data, a subframe on which the backhaul data is transmitted may be configured not to be heard by the terminal.

In order to prevent the terminal from hearing the backhaul data, used is an MBMS (Multimedia Broadcast/Multicast Service) in 3GPP. The MBMS indicates a streaming service or a background broadcast service or a multicast service provided to a plurality of terminals with using an MBMS bearer service for DL use only. Here, the MBMS may be categorized into a multi-cell service for providing the same service to a plurality of cells, and a single cell service for providing the same service to one cell. In case of the multi-cell service, the terminal may receive, through combinations, the same multi-cell service transmitted from a plurality of cells in an MBSFN (MBMS Single Frequency Network) manner.

However, a legacy terminal which does not support an MBSFN does not perform measurements with respect to a reference signal on a subframe allocated as the MBSFN subframe.

Under this configuration, once a subframe on which backhaul data is transmitted/received between the relay station 30 and the base station 20 is set as an MBSFN subframe, the terminal does not perform measurements with respect to a reference signal on a subframe allocated as the MBSFN subframe.

FIG. 3 illustrates a HARQ process.

As shown in FIG. 3, in the conventional art, a HARQ process is performed for efficient data transfer as follows.

1) First of all, the base station 20 transmits first data to the relay station 30 on a data channel.

2) Then, upon receipt of the first data, the relay station 30 attempts to decode the first data. The relay station 30 transmits a HARQ feedback to the base station 20 according to a result of the decoding. That is, the relay station 30 transmits an ACK signal to the base station in the event of success of the decoding, but transmits a NACK signal to the base station in the event of the decoding. Here, the ACK/NACK signals are transmitted after a predetermined time interval from a reception time point of the data.

3) Upon reception of the ACK signal, the base station 20 determines that the data has been successfully transmitted to the relay station 30. Then, the base station 20 transmits subsequent first data after a predetermined time interval from a reception time point of the ACK signal. On the other hand, upon reception of the NACK signal, the base station 20 determines that the data has been unsuccessfully transmitted to the relay station 30. Then, the base station 20 re-transmits the same first data after a predetermined time interval from a reception time point of the NACK signal, in the same manner or in a new manner.

4) After a predetermined time interval from a transmission time point of the NACK signal, the relay station 30 attempts to receive the first data.

5) Upon reception of the re-transmitted first data, the relay station 30 attempts a decoding process. In the event of success of the decoding, the relay station 30 transmits an ACK signal to the base station after a predetermined time interval from a reception time point of the first data. On the other hand, in the event of failure of the decoding, the relay station 30 transmits a NACK signal to the base station after a predetermined time interval from a reception time point of the first data. The relay station 30 transmits a NACK signal and receives the first data again until it succeeds in decoding the first data. These processes are repeatedly performed.

As can be seen from the above, when transmitting data through an uplink from the relay station 30 to the base station 20, a synchronous HARQ is used.

Here, the synchronous HARQ means that a time interval between data transmissions is constant.

More concretely, when the relay station 30 is to re-transmit data, the re-transmission is performed after a pre-determined time from the previous transmission.

For instance, in a 3PP E-UTRA system, a synchronous HARQ is used to transmit data and ACK/NACK, respectively with a time interval of 4 ms. In the 3GPP E-UTRA system, the synchronous HARQ is used not only for the DL, but also for data transmission in the DL from the base station 20 to the relay station 30.

More concretely, in the 3GPP E-UTRA system, a data packet is transmitted on the $n^{th}$ subframe of one frame. And, ACK/NACK with respect to the data packet are transmitted on the $(n+4)^{th}$ subframe. Since the subframe has a time interval of 1 ms, the ACK/NACK signals with respect to the data packet are transmitted with a time interval of 4 ms. If the NACK signal is received on the $(n+4)^{th}$ subframe, a transmitter re-transmits the data on the $(n+8)^{th}$ subframe. The data is re-transmitted with a time interval of 8 ms. Accordingly, this process may be referred to as a HARQ process having a period of 8 ms.

As aforementioned, once a subframe where backhaul data is transmitted/received between the relay station 30 and the base station 20 is established (set) as an MBSFN subframe, a terminal connected to the relay station does not receive a subframe allocated as the MBSFN subframe, and the corresponding subframe does not perform measurements with respect to a reference signal. However, the terminal has to receive a signal transmitted from the relay station on subframes not allocated as the MBSFN.

FIG. 4 illustrates problems occurring when using a synchronous UL HARQ.

As shown in FIG. 4, one frame includes 0~9 subframes. The upper frames indicate frames corresponding to a down-link (DL) from the base station 20, and a DL from the relay station to the terminal. On the other hand, the lower frames indicate frames corresponding to an uplink (UL) by the terminal, and a UL by the relay station 30. Each subframe has a length of 1 ms. The subframes represented with a dark color in the UL indicate subframes not allocated for MBSFN, and the subframes represented with a bright color in the UL indicate subframes which can be allocated for MBSFN.

As aforementioned, a subframe allocated as an MBSFN for UL backhaul data is not received by the terminal, and a reference signal inside the subframe is not measured by the terminal.

Control information is important information like a synchronous signal and a paging message. Accordingly, a subframe on which the control information is transmitted is not set as an MBSFN subframe. For instance, since $0^{th}$, $4^{th}$, $5^{th}$ and $9^{th}$ subframes in an FDD mode of a 3GPP E-UTRAN system are used for transmission of the above important information, they are not set as MBSFN subframes.

Therefore, the relay station 30 has to relay the important information to the terminals on the subframes, and does not set the subframes as MBSFN subframes.

In this case, the subframes on which the important information is transmitted may collide with subframes for the HARQ process with respect to backhaul data.

For instance, it is assumed that a HARQ process having a period of 8 ms with respect to backhaul data is performed.

As shown in FIG. 4, the relay station 30 receives backhaul data on the $1^{st}$ subframe (n=1) of frame 0. Then, the relay station 30 transmits a NACK signal with respect to the backhaul data on the $5^{th}$ subframe (n+4) of frame 0.

Upon reception of the NACK signal, the base station 20 re-transmits the backhaul data on the 9$^{th}$ DL subframe (n+8) of frame 0.

However, the 9$^{th}$ subframe of the DL has to be used for the relay station 30 to transmit the important information to the terminals.

On the 9$^{th}$ subframe of frame 0, the relay station 30 has to transmit the important information and has to simultaneously receive the backhaul data from the base station 20. This may cause collisions. It is impossible to simultaneously perform transmission and reception on the subframe of the DL.

Likewise, on the 7$^{th}$ subframe of frame 2, transmission and reception have to be simultaneously performed. This may also cause collisions.

SUMMARY OF THE INVENTION

Therefore, the present invention is to solve the aforementioned problems.

More concretely, the present invention is to provide a new HARQ scheme between a base station and a relay station.

To achieve these and other advantages and in accordance with the purpose of the present invention, as embodied and broadly described herein, there is provided a method for transmitting/receiving data by a relay station, the method comprising: enabling the relay station to receive data on an n$^{th}$ subframe of a downlink from a base station; determining a position of a subframe of an uplink to which data is to be transmitted, if any data to be transmitted exists, wherein the position of said subframe is determined as an (n+k)$^{th}$ subframe, wherein said k is determined by the value of said n and by information on a preset HARQ; and transmitting the data on an (n+k)$^{th}$ subframe of the uplink.

The information on a preset HARQ may indicate whether a HARQ process is performed on an even-numbered subframe or an odd-numbered subframe.

The method may further comprise receiving a control signal including the information on a preset HARQ, from the base station.

The data to be transmitted may include an ACK or NACK signal with respect to the received data. The received data may include grant information with respect to a request for resource allocations on an uplink. The n$^{th}$ subframe may be an MBSFN subframe.

To achieve these and other advantages and in accordance with the purpose of the present invention, as embodied and broadly described herein, there is also provided a method for transmitting/receiving data by a base station, the method comprising: determining, by the base station, a HARQ process with respect to data to be transmitted to a relay station; transmitting, by the base station, to the relay station, data on an n$^{th}$ subframe of a downlink; hearing an (n+k)$^{th}$ subframe of an uplink, by the base station, so as to receive data transmitted from the relay station in correspondence to the data transmitted from the base station, wherein the k is determined based on the value of said n and the determined HARQ process; and re-transmitting the transmitted data or transmitting subsequent data according to whether the data has been received on the (n+k)$^{th}$ subframe of the uplink.

The method may further comprise transmitting, by the base station, to the relay station, information on the determined HARQ process.

To achieve these and other advantages and in accordance with the purpose of the present invention, as embodied and broadly described herein, there is still also provided a method for transmitting/receiving data by a base station, the method comprising: transmitting, by the base station, to a relay station, data on an n$^{th}$ subframe of a downlink (DL); determining whether an (n+4)$^{th}$ DL subframe is for transmission of system information; if the (n+4)$^{th}$ DL subframe is for transmission of system information, shifting from an (n+4)$^{th}$ subframe to another subframe of an uplink, and monitoring data reception from the relay station; and re-transmitting the transmitted data or transmitting subsequent data to the relay station, according to the data received from the relay station on said another subframe of the uplink.

Said another subframe may be an (n+3)$^{th}$ subframe or an (n+5)$^{th}$ subframe.

The present invention may solve the conventional problems by proposing a new HARQ scheme between the base station and the relay station.

Furthermore, the present invention may allow data to be efficiently transmitted and received by proposing a new HARQ scheme between the base station and the relay station.

DETAILED DESCRIPTION OF THE INVENTION

Figure 1:
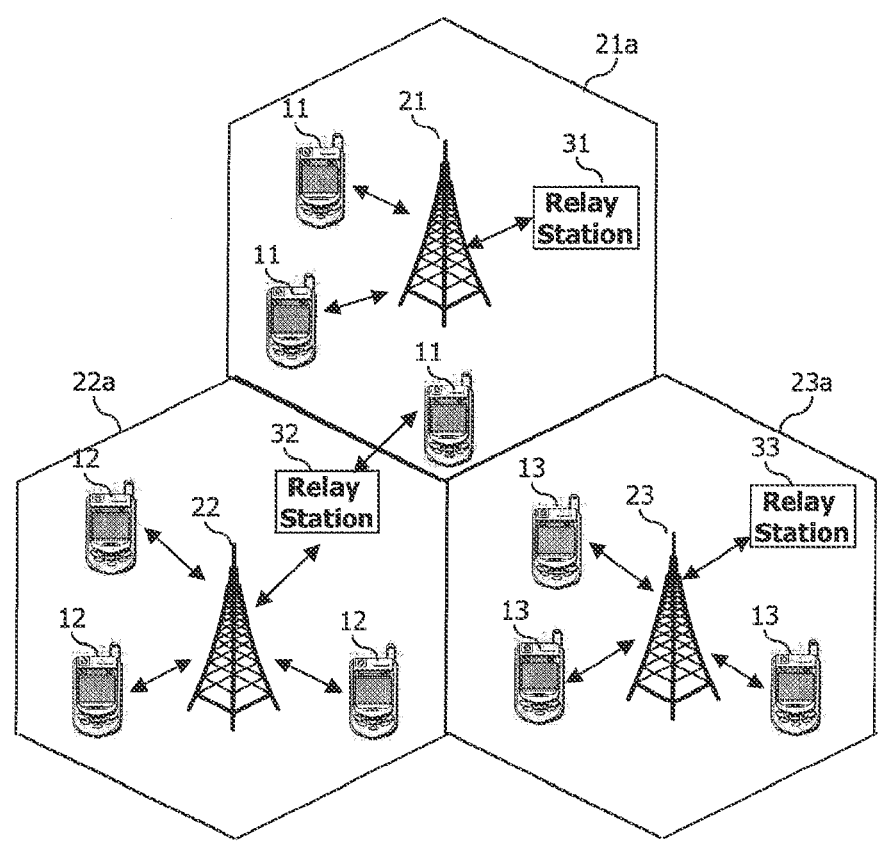
FIG. 1 illustrates a radio communications system using a relay station.
Figure 2:
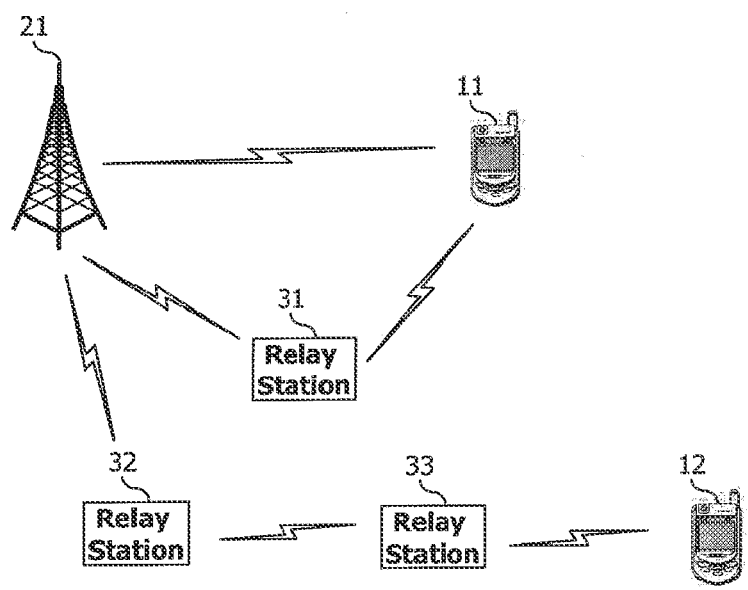
FIG. 2 illustrates communications between a base station and a terminal through a relay station.
Figure 3:
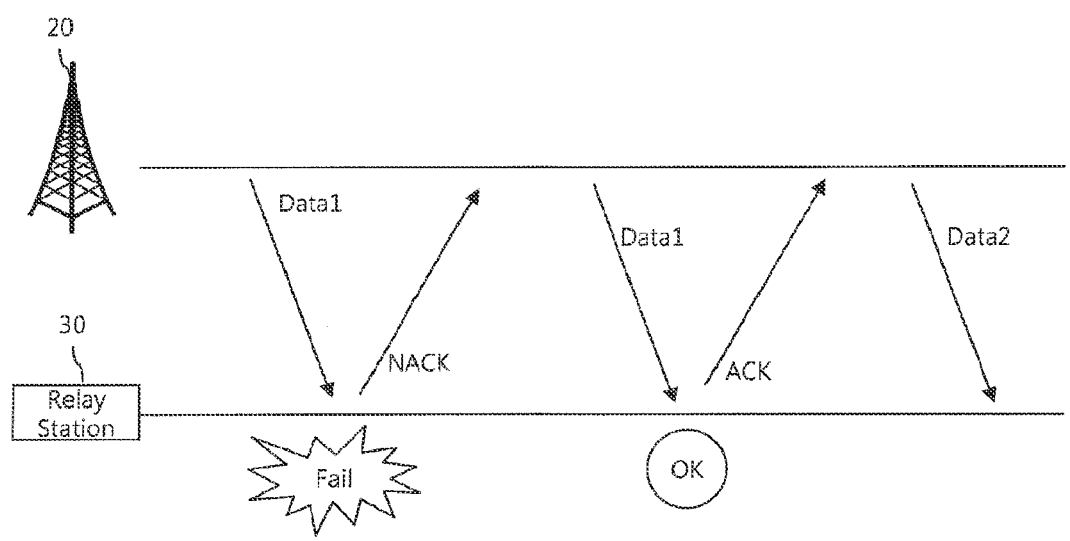
FIGS. 3 and 4 illustrate influences by interference due to the introduction of a relay station.
Figure 4:
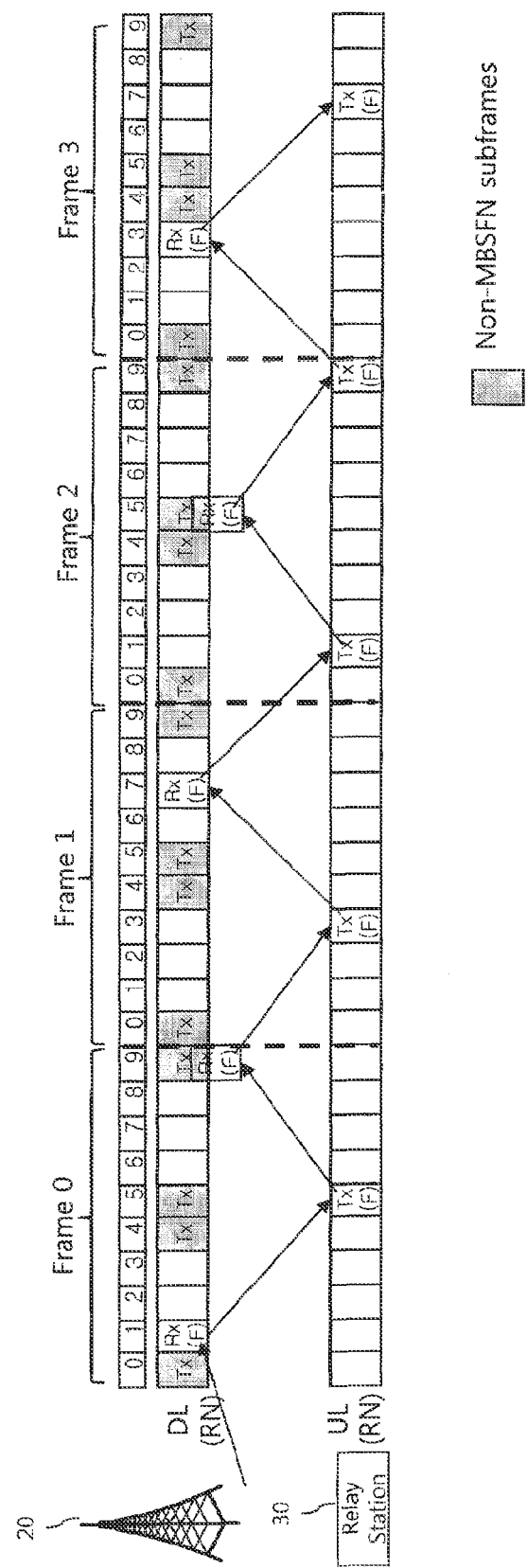

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art.

Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents Hereinafter, the term of a terminal will be used. This terminal may be referred to as a UE (User Equipment), an ME (Mobile Equipment), an MS (Mobile Station), a UT (User Terminal), an SS (Subscriber Station), a wireless device, a handheld device and an AT (Access Terminal). And, the terminal may be a portable device such as a portable phone, a PDA, a smart phone, a wireless modem and a notebook, or may be an unportable device such as a PC and a vehicle-mounted device.

The present invention illustrated in the drawings may be implemented by TDMA, CDMA, CDMA2000, WCDMA, OFDMA, etc.

The TDMA (time division multiple access) may be implemented by radio technologies such as GSM (Global System for Mobile communications)/GPRS (General Packet Radio Service)/EDGE (Enhanced Data Rates for GSM Evolution). The CDMA 2000 refers to a CDMA (code division multiple access)-based radio technology. The WCDMA (Wideband CDMA) may be implemented by radio technologies such as UTRAN (Universal Terrestrial Radio Access Network) by a 3GPP (3rd Generation Partnership Project) standardization organization. The OFDMA (orthogonal frequency division multiple access) may be implemented by radio technologies such as IEEE 802.11 (Wi-Fi), IEEE 802.16 (WiMAX), IEEE 802-20 and E-UTRAN (Evolved-UTRAN). The LTE (long term evolution) is part of E-UMTS (Evolved-UMTS) using E-UTRAN, which adopts an OFDMA on a downlink but adopts an SC-FDMA (single carrier frequency division multiple access) on an uplink. The LTE-A (Advanced) is a form evolved from the LTE.

Downlink resource used in the present invention indicates DL band in an FDD system, and a DL subframe in a TDD system. And, uplink resource used in the present invention indicates UL band in an FDD system, and a UL subframe in a TDD system.

Figure 5:
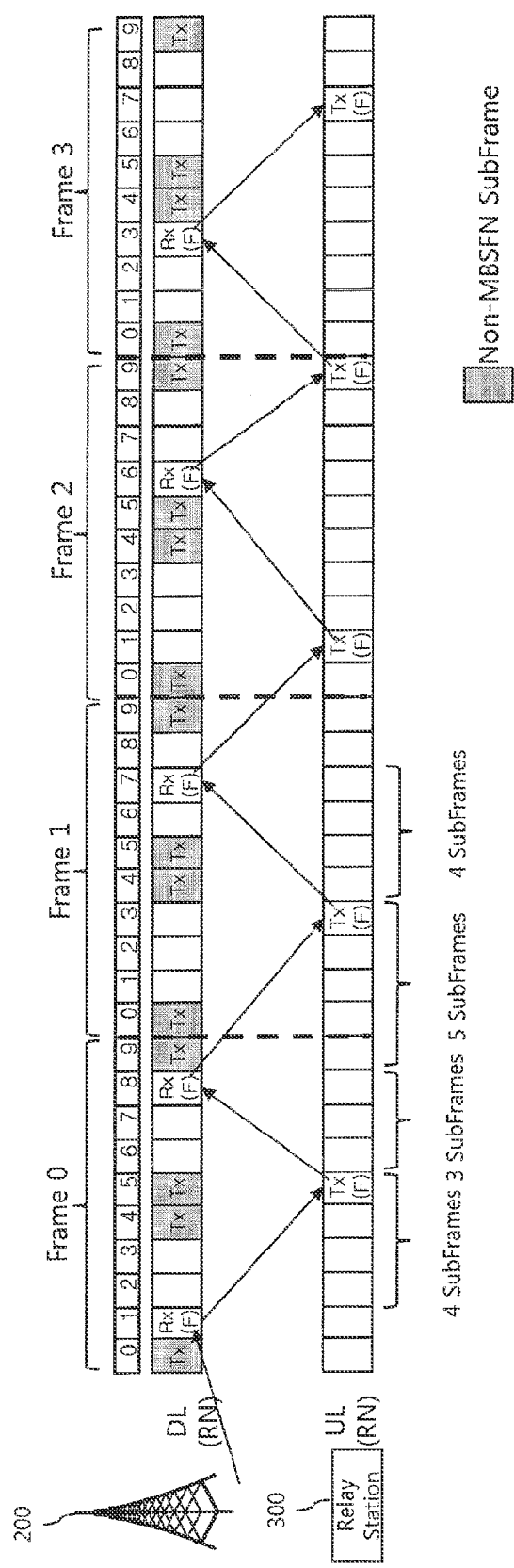
FIG. 5 is an exemplary view illustrating a first embodiment of the present invention.
Figure 6:
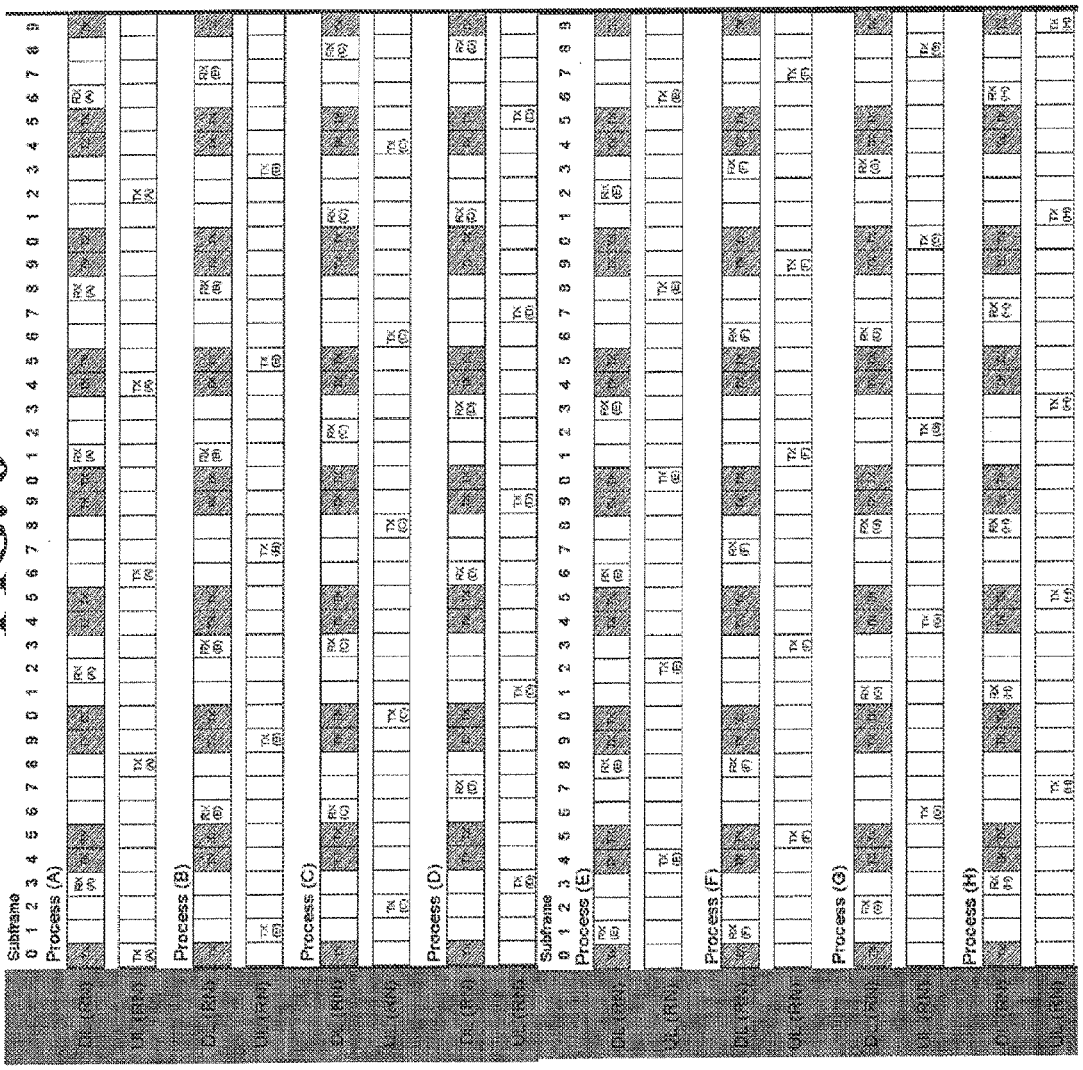
FIG. 6 illustrates all available HARQ processes according to a first embodiment of the present invention.
Figure 7:
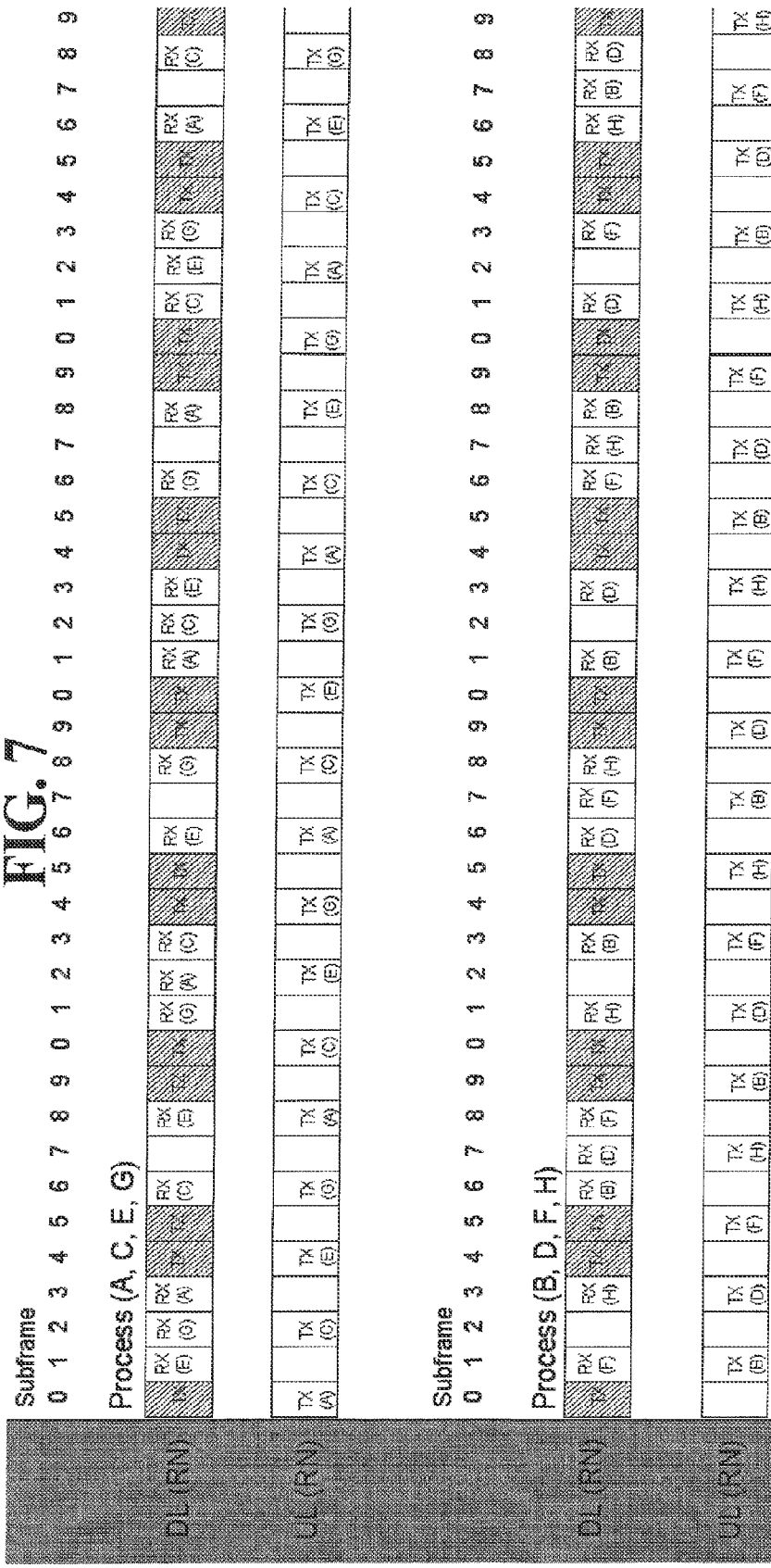
FIG. 7 illustrates HARQ processes which can be used without collisions according to a first embodiment of the present invention.

FIG. 5 is an exemplary view illustrating a first embodiment of the present invention, FIG. 6 illustrates all available HARQ processes according to a first embodiment of the present invention, and FIG. 7 illustrates HARQ processes which can be used without collisions according to a first embodiment of the present invention.

As can be seen from FIG. 5, the first embodiment of the present invention is implemented so as to perform a HARQ process having a period of 8 ms, without collisions of subframes in a link for backhaul data between a base station 200 (e.g., eNodeB) and a relay station (RN) 300.

In the first embodiment, collisions of subframes are prevented by shifting from one subframe to another subframe.

The first embodiment will be explained in more details as follows.

First of all, checked are UL subframes, the subframes allocated between the base station 200 and the relay station 300. For instance, it is checked whether the allocated subframes have a period of 8 ms. That is, it is checked whether a transmission period of backhaul data from the relay station to the base station is 8 ms.

In the case that an $n^{th}$ UL subframe is allocated for the backhaul data, it is checked whether an $(n+4)^{th}$ subframe of a downlink between the base station 200 and the relay station 300 has been allocated as an MBSFN subframe.

If the $(n+4)^{th}$ DL subframe between the base station 200 and the relay station 300 has been allocated as an MBSFN subframe (i.e., if the $(n+4)^{th}$ DL subframe is not the $0^{th}$, $4^{th}$, $5^{th}$ and $9^{th}$ subframe), the $(n+4)^{th}$ DL subframe is allocated for the backhaul data. Backhaul data transmitted on the $(n+4)^{th}$ DL subframe may be ACK/NACK, or may be a UL Grant with respect to request for UL resource allocations. The ACK/NACK may be ACK/NACK with respect to backhaul data transmitted by the relay station on the $n^{th}$ subframe. The UL Grant may indicate transmission of backhaul data by the relay station on a UL subframe corresponding to the $(n+8)^{th}$ DL subframe.

In the case that the $(n+4)^{th}$ DL subframe has not been allocated as an MBSFN subframe (i.e., if the $(n+4)^{th}$ DL subframe is the $0^{th}$, $4^{th}$, $5^{th}$ and $9^{th}$ subframe), it is checked whether the $(n+5)^{th}$ DL subframe has been allocated as an MBSFN subframe. If the $(n+5)^{th}$ DL subframe has been allocated as an MBSFN subframe, the $(n+5)^{th}$ DL subframe may be allocated for backhaul data between the base station and the relay station. Similarly, if the $(n+5)^{th}$ subframe is a UL subframe, backhaul data transmitted on the $(n+5)^{th}$ UL subframe may ACK/NACK, or may be a UL Grant with respect to request for UL resource allocations.

In the case that the (n+4)$^{th}$ subframe and the (n+5)$^{th}$ subframe have not been allocated as MBSFN subframes, it is checked whether the (n+3)$^{th}$ subframe can be allocated for an MBSFN subframe. If the (n+3)$^{th}$ subframe can be allocated for an MBSFN subframe, the (n+3)$^{th}$ subframe can be allocated for backhaul data between the base station and the relay station.

As aforementioned, in the first embodiment of the present invention, the relay station may transmit data to the base station with a period of 8 ms, and the subframe for responding with respect to the data (e.g., for transmitting ACK/NACK or a UL grant) may be dynamically shifted.

Referring to FIG. 5, the relay station may transmit data with a period of 8 ms (n+8). That is, the relay station may transmit data on the 5$^{th}$ subframe (n) of frame 0, the 3$^{rd}$ subframe (n+8) of frame 1 and the 1$^{st}$ subframe (n+16) of frame 2. However, data of the base station corresponding to data on the n$^{th}$ subframe of the relay station may be transmitted on the 8$^{th}$ subframe corresponding to the (n+4−1)$^{th}$ subframe, or may be transmitted on the (n+4+1)$^{th}$ subframe.

As can be seen from FIG. 6, the base station 200 may allocate one or more subframes with respect to backhaul data of the relay station 300. For instance, with respect to backhaul data transmitted on the 3$^{rd}$ subframe, the base station 200 may allocate at least one or more subframes based on a process A (i.e., 8$^{th}$ subframe (n+4+1)) and at least one or more subframes based on a process H (i.e., 7$^{th}$ subframe (n+4−1)).

The base station 200 may allocate the subframe based on a process A and the subframe based on a process H simultaneously or sequentially, with respect to the backhaul data transmitted on the 3$^{rd}$ subframe. As one example, when backhaul data has been transmitted on the n$^{th}$ DL subframe, the base station 200 firstly allocates the subframe based on a process A. When UL backhaul data has not been received on the subframe based on a process A, the base station 200 allocates the subframe based on a process H. As another example, in case of receiving UL backhaul data from the relay station after transmitting backhaul data on the n$^{th}$ DL subframe, the base station 200 determines whether the UL backhaul data corresponds to the subframe based on a process A and the subframe based on a process H. And, the base station 200 determines one of the subframe based on a process A and the subframe based on a process H to which the received UL backhaul data corresponds. As a result, the base station 200 may determine a type of DL data previously-transmitted by itself corresponding to the received UL backhaul data.

As can be seen from FIG. 7, when backhaul data is transmitted on the even-numbered UL subframes (0, 2, 4, 6 . . . ) with a period of 8 ms, the base station 200 may operate four processes (A, C, E and G) in the downlink without collisions. That is, one relay station may simultaneously operate four or more processes without collisions.

As can be seen from FIG. 7, when backhaul data is transmitted on the odd-numbered UL subframes (1, 3, 5, 7 . . . ) with a period of 8 ms, the base station 200 may operate four processes (B, D, F and H) in the downlink without collisions.

As aforementioned, in an assumption that an (n+4−1) HARQ process (i.e., (n+3) HARQ process) is performed, a time duration for which the base station 200 can decode the backhaul data transmitted from the relay station 300 on the n$^{th}$ UL subframe is 3 ms.

For instance, in the case that the relay station 300 has transmitted backhaul data on the 5$^{th}$ UL subframe of frame 0 as shown in FIG. 5, the base station 200 has to decode the backhaul data before the 8$^{th}$ subframe (n+3=5+3), and has to transmit ACK/NACK. Similarly, in the case that the relay station 300 has transmitted backhaul data on the 6$^{th}$ UL subframe of frame 2, the base station 200 has to decode the backhaul data before the 9$^{th}$ subframe.

The base station 200 has to complete the decoding within 3 ms shorter than the general period (4 ms) by 1 ms.

This means that the base station 200 has to be provided with a faster processing capability. However, when the base station 200 cannot perform the decoding within 3 ms due to data congestion, the ACK/NACK are transmitted with delay.

In the present invention, when the base station 200 cannot perform the decoding within 3 ms, the base station 200 may transmit an ACK/NACK on the first subframe among backhaul link subframes subsequent to the (n+3)$^{th}$ subframe (i.e., the first subframe allocated to a backhaul link among the (n+4)$^{th}$, (n+5)$^{th}$ . . . subframes).

The delay of the ACK/NACK may be limited into a subframe corresponding to the same process. For instance, when the base station 200 operates HARQ processes (A, C, E and F) for the relay station 300, ACK/NACK with respect to backhaul data transmitted on the 0$^{th}$ UL subframe of frame 0 corresponding to the process A may be transmitted on the 2$^{nd}$ subframe of frame 1, i.e., the DL subframe of the first HARQ process A among a plurality of subframes after the decoding time (4 ms).

Alternatively, the base station 200 may operate a plurality of HARQ processes for the relay station 300, and may attempt to firstly transmit the ACK/NACK on a sub frame for the 1$^{st}$ HARQ process among the plurality of HARQ processes. For instance, the base station 200 may operate HARQ processes (A, C, E and F) for the relay station 300, and may transmit the ACK/NACK on the 1$^{st}$ subframe among subframes which are used to transmit backhaul data and exist after decoding time.

More concretely, when the relay station 300 has transmitted backhaul data to the base station 200 on the 0$^{th}$ UL subframe of frame 0 corresponding to the HARQ process A, the base station 200 may transmit the ACK/NACK on the 6$^{th}$ DL subframe of frame 0 (corresponding to a subframe for the HARQ process C), the first DL subframe among subframes after the decoding time (4 ms) in one of the HARQ processes (A, C, E and F). Then, the relay station 300 transmits the backhaul data on the 0$^{th}$ subframe, and then monitors the downlink. For monitoring the DL, the relay station 300 may use information on the HARQ processes (A, C, E and F) allocated thereto. The relay station 300 firstly attempts to receive ACK/NACK on a subframe for the first HARQ process based on the information. When the information on the HARQ processes is not used, the relay station 300 monitors reception of the ACK/NACK in the downlink. Upon reception of the ACK/NACK, the relay station 300 determines one of a plurality of backhaul data transmitted by itself, the backhaul data to which the ACK/NACK corresponds.

This configuration may be also applied to transmission of backhaul data to the relay station 300 from the base station 200.

Figure 8:
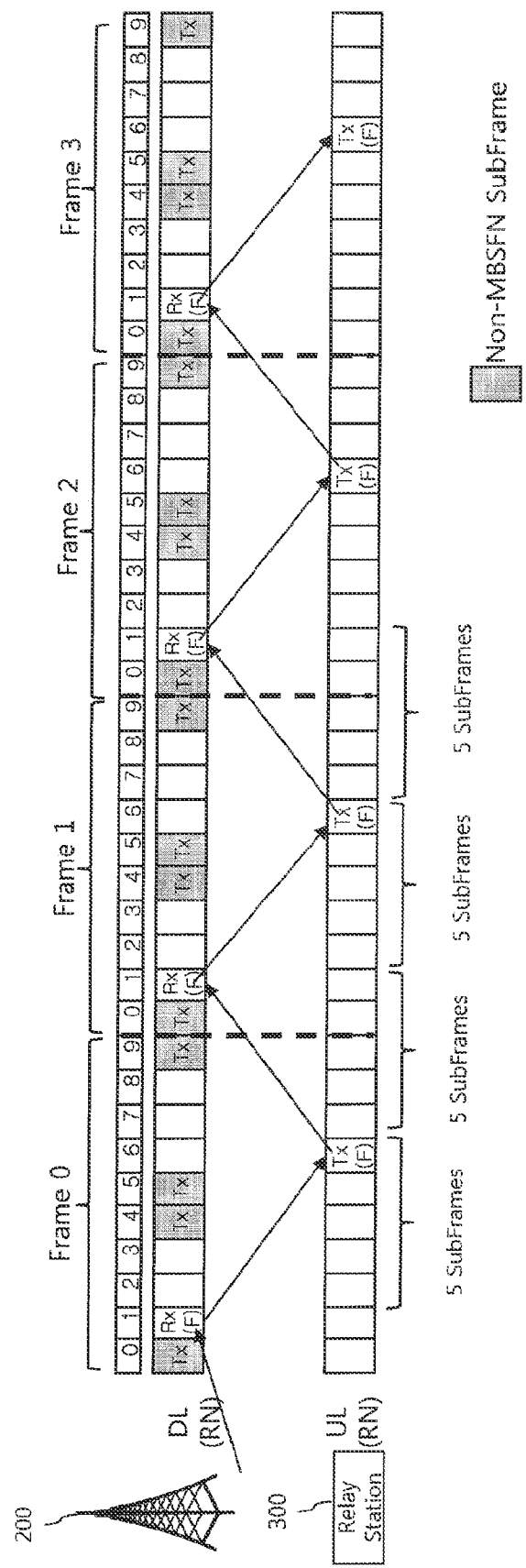
FIG. 8 is an exemplary view illustrating a second embodiment of the present invention.
Figure 9:
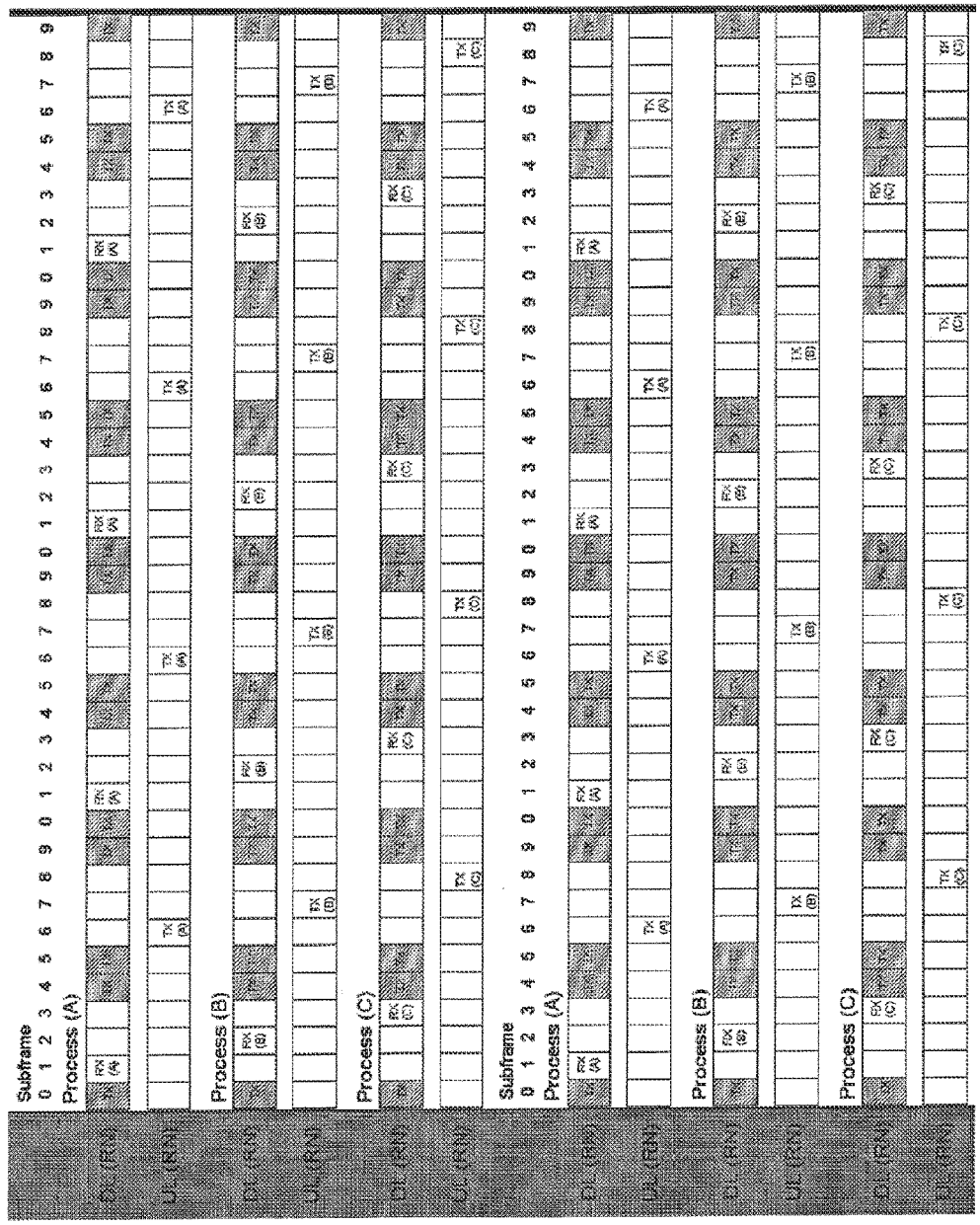
FIG. 9 illustrates all available HARQ processes according to a second embodiment of the present invention.

FIG. 8 is an exemplary view illustrating a second embodiment of the present invention, and FIG. 9 illustrates all available HARQ processes according to a second embodiment of the present invention.

As can be seen from FIG. 8, in the second embodiment of the present invention, a HARQ process having a period of 10 ms is used to prevent collisions between a subframe for backhaul data and a subframe not allocated as an MBSFN subframe, in a link for backhaul data between the base station (e.g., eNodeB) and the relay station 300.

For this, a period of 10 ms is implemented in the second embodiment of the present invention. This may facilitate transmission of important information, such as control information, to the terminal 100 by the relay station 300. Especially, the period of 10 ms well matches transmission periods of a plurality of control signals specified in the current 3GPP E-UTRA system.

For instance, in the current 3GPP E-UTRA system, it is regulated for the terminal 100 to transmit control information, such as scheduling request (SR), channel quality information (CQI) and a sounding reference signal (SRS). The SR may be transmitted with a period selected from 5 ms, 10 ms, 20 ms, 40 ms and 80 ms. And, the CQI may be transmitted with a period selected from 2 ms, 5 ms, 10 ms, 20 ms, 40 ms, 80 ms and 160 ms. And, the SRS may be transmitted with a period selected from 2 ms, 5 ms, 10 ms, 20 ms, 40 ms, 80 ms, 160 ms and 320 ms. Most of control information has a period of 10 ms. Accordingly, if a period of 10 ms is used in the second embodiment, the relay station 300 may transmit backhaul data more easily.

More concretely, an operation based on the period of 10 ms will be explained as follows.

The base station 200 transmits, on the $n^{th}$ DL subframe, backhaul data (e.g., a grant message with respect to request for UL resources by the relay station, or ACK/NACK).

Then, the relay station 300 transmits, on the $(n+5)^{th}$ subframe, data (e.g., including ACK/NACK) corresponding to the data received on the $n^{th}$ subframe.

Upon receipt of the data from the relay station on the $(n+5)^{th}$ subframe, the base station 200 transmits, on the $(n+10)^{th}$ DL subframe, data corresponding to the received data (e.g., retransmits the previously-transmitted data, or transmits ACK/NACK or a grant message).

By dividing the period of 10 ms into 5:5, the relay station and the base station may have the same decoding time thus to be operated more effectively. Furthermore, since it takes 5 ms to decode received data, the relay station and the base station may be operated more effectively.

More concretely, as can be seen from FIG. 8, in the case that the base station 200 has transmitted backhaul data on the $1^{st}$ DL subframe, data corresponding to the backhaul data may be transmitted on the $6^{th}$ subframe corresponding to the $(n+5)^{th}$ UL subframe.

Referring to FIG. 9, illustrated are all available HARQ processes according to a second embodiment of the present invention. According to the second embodiment, six HARQ processes may be operated, and the six HARQ processes may be divided into two subsets. Three processes (A, C and E) by the first subset occupy the even-numbered UL subframes, and the three processes (B, D and F) by the second subset occupy the odd-numbered UL subframes.

In order to prevent collisions between HARQ processes having a period of 8 ms for the terminal in the uplink, the process for backhaul data in the relay station may be restricted into one of the two subsets. For instance, when the even-numbered subframes are allocated for backhaul data transmitted/received to/from the relay station in the uplink, the odd-numbered UL subframes are allocated for the terminal. This may prevent the occurrence of collisions. An opposite case may be implemented. Therefore, the relay station may allow both the HARQ process having a period of 10 ms for backhaul data, and the HARQ process having a period of 8 ms for the terminal, without collisions.

The relay station may receive a message from an upper layer, and configure the message, the message including a control signal for allowing the relay station to use only even or odd-numbered subframes.

Figure 10:
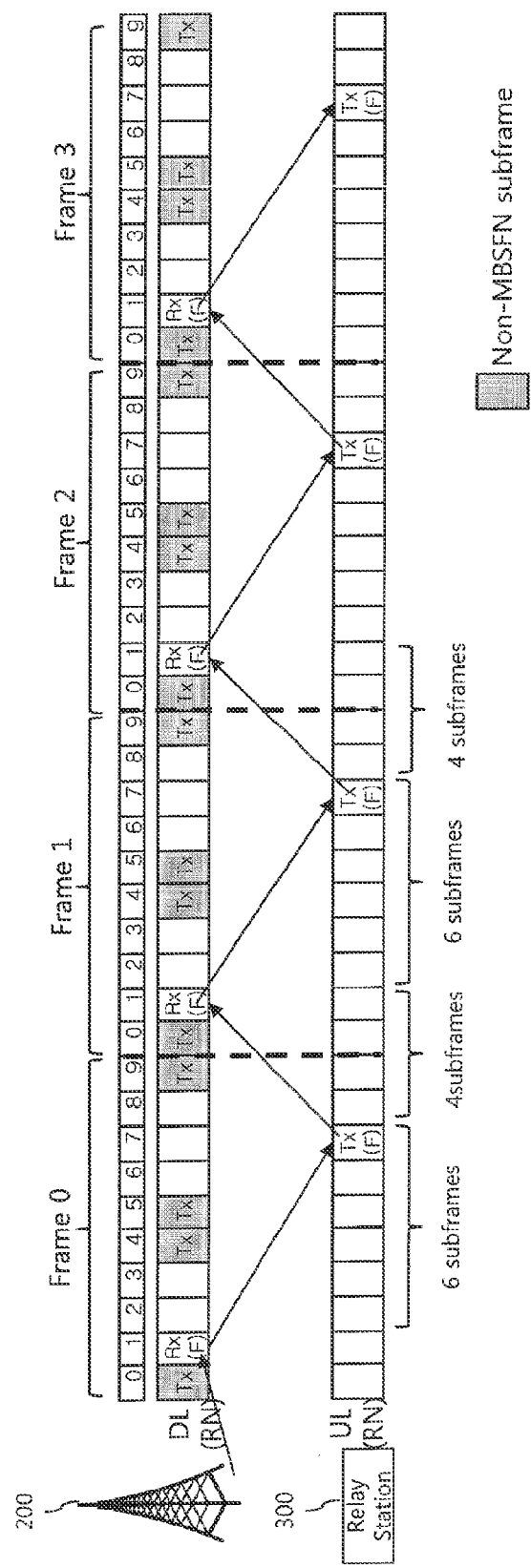
FIG. 10 is an exemplary view illustrating a third embodiment of the present invention.
Figure 11:
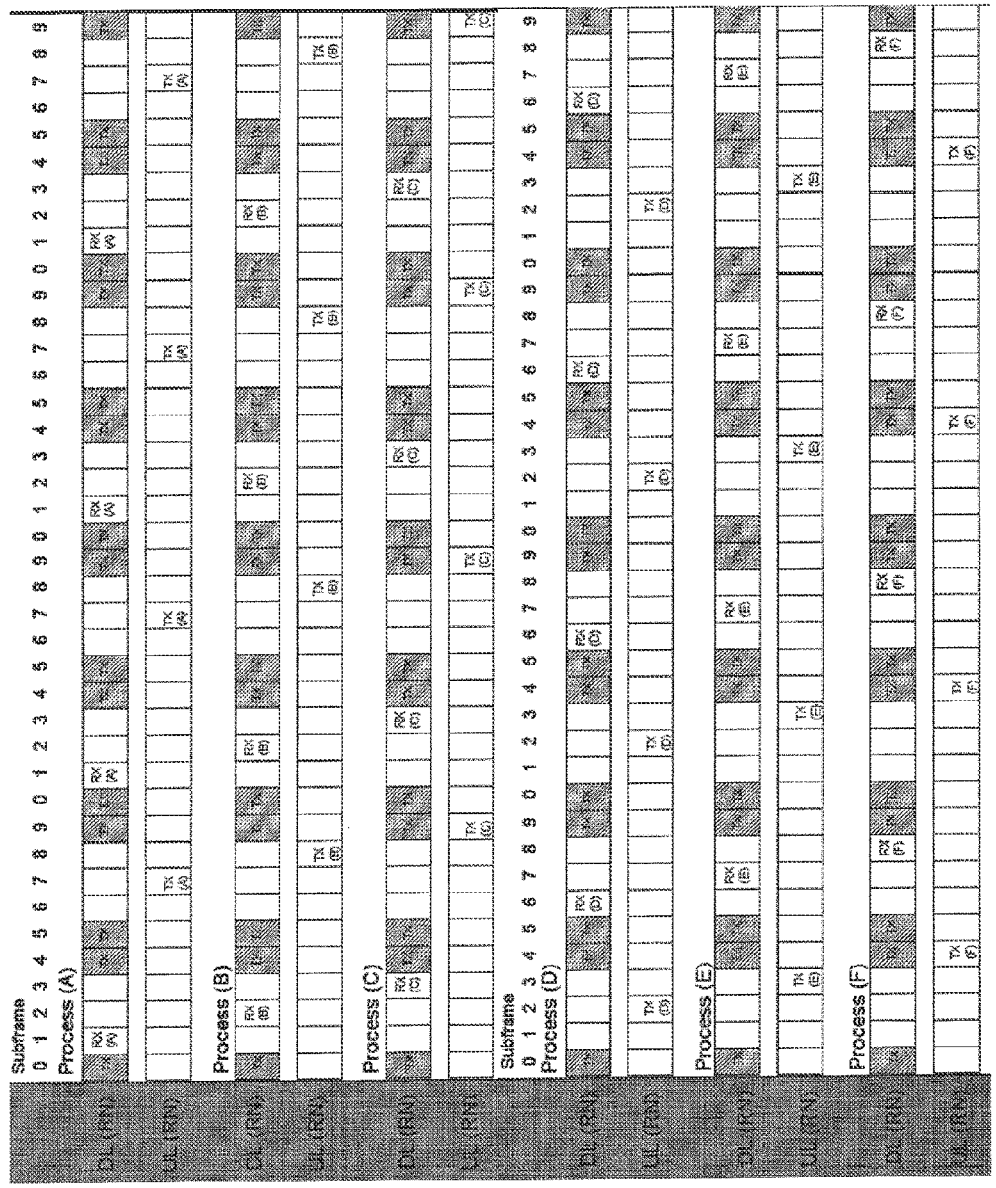
FIG. 11 illustrates all available HARQ processes according to a third embodiment of the present invention.

FIG. 10 is an exemplary view illustrating a third embodiment of the present invention, and FIG. 11 illustrates all available HARQ processes according to a third embodiment of the present invention.

According to the third embodiment, a HARQ process having a period of 10 ms is implemented like in the second embodiment, which will be explained in more details as follows.

The base station 200 transmits, on the $n^{th}$ DL subframe (e.g., the $1^{st}$ subframe of frame 0 of FIG. 10), backhaul data (e.g., a grant message with respect to request for UL resources by the relay station, or ACK/NACK).

Then, the relay station 300 transmits, on the $(n+6)^{th}$ subframe (e.g., the $7^{th}$ subframe of frame 0 of FIG. 10), data (e.g., including ACK/NACK) corresponding to the data received on the $n^{th}$ subframe.

Upon receipt of the data from the relay station on the $(n+6)^{th}$ subframe, the base station 200 transmits, on the $(n+10)^{th}$ DL subframe (the $1^{st}$ subframe of frame 1), data corresponding to the received data (e.g., retransmits the previously-transmitted data, or transmits ACK/NACK or a grant message).

By dividing the period of 10 ms into 6:4, the relay station may have a decoding time of 6 ms. Generally, the relay station has a lower performance than the base station. Accordingly, it is very advantageous for the relay station to have a longer decoding time. Since the relay station has a longer decoding time, a signal processor for a higher performance is not required. This may allow the relay station to be fabricated with lower costs.

As can be seen from FIG. 11, in the third embodiment, all available HARQ processes may include A, B, C, D, E and F processes.

However, since only six processes may be used in the third embodiment, there is a great restriction on link allocations between the relay station and the terminal when utilizing backhaul resources up to 60%. This problem may be solved by the following fourth embodiment.

Figure 12:
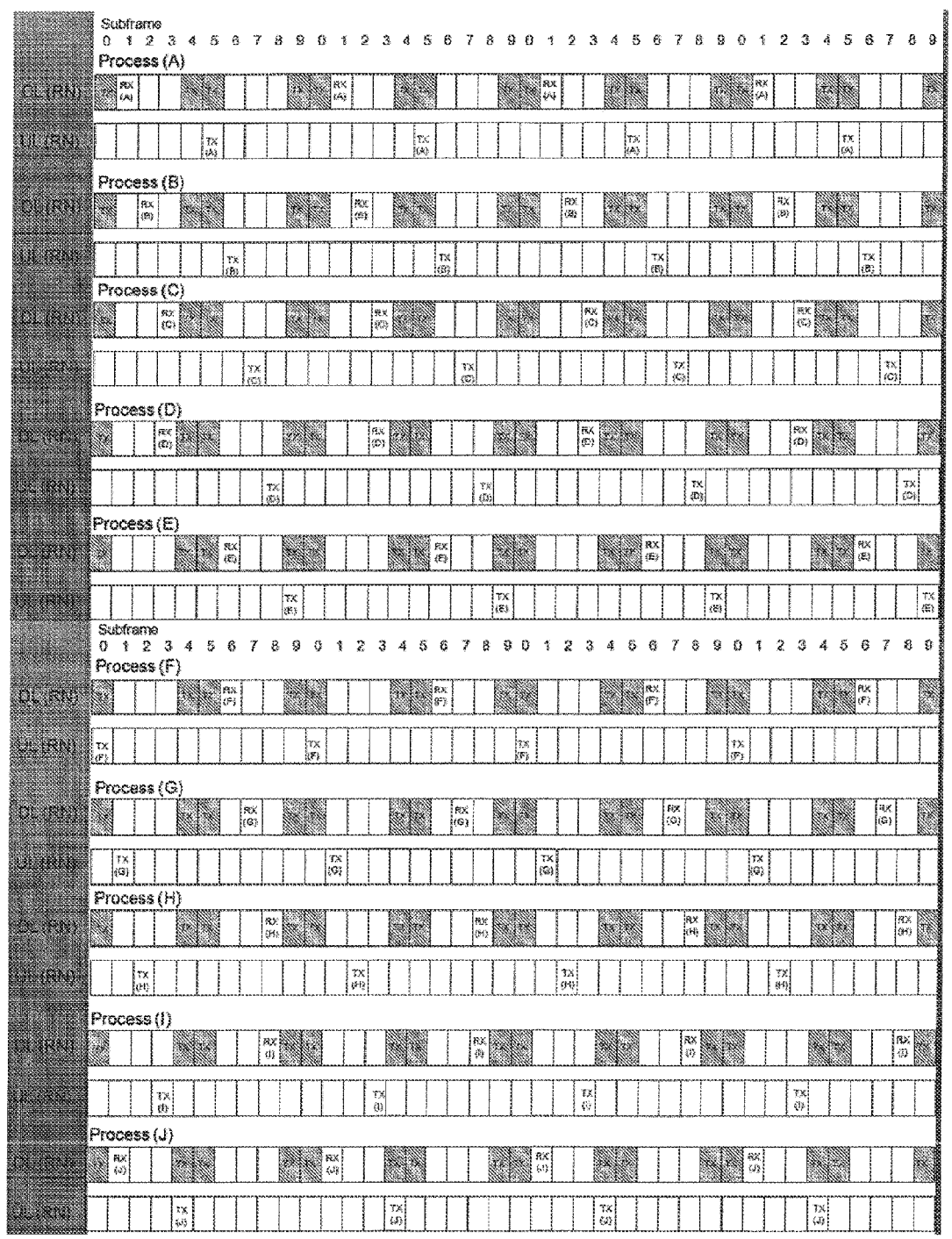
FIG. 12 illustrates all available HARQ processes according to a fourth embodiment of the present invention.
Figure 13:
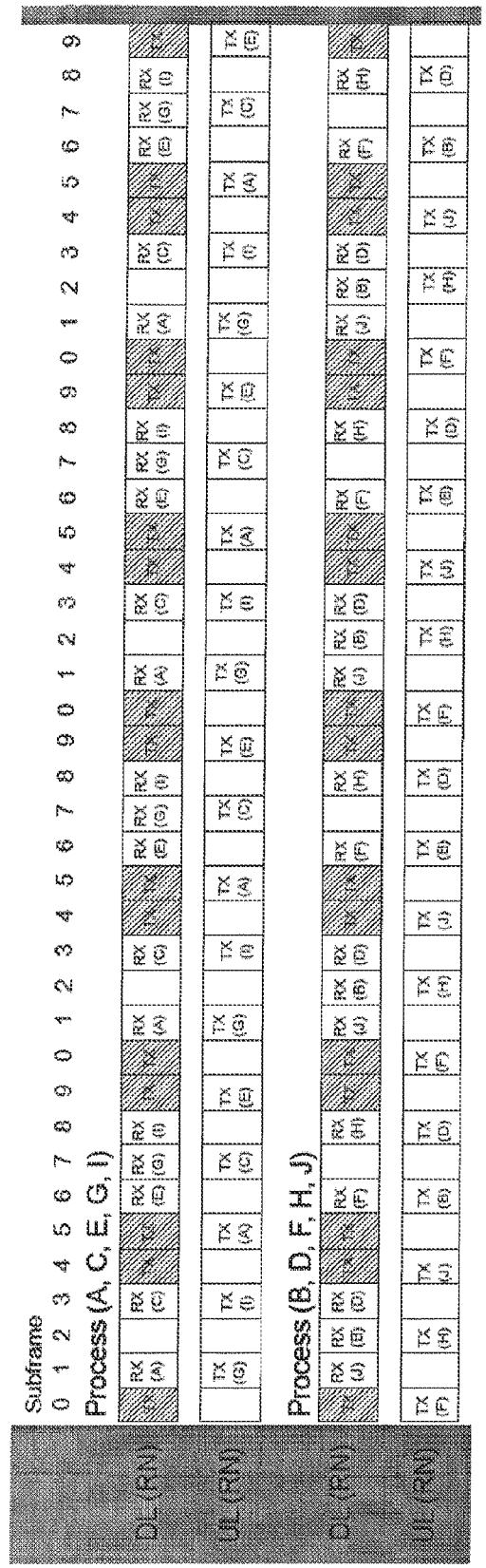
FIG. 13 illustrates HARQ processes which can be used without collisions according to a fourth embodiment of the present invention.

FIG. 12 illustrates all available HARQ processes according to a fourth embodiment of the present invention, and FIG. 13 illustrates HARQ processes which can be used without collisions according to a fourth embodiment of the present invention.

In the fourth embodiment, another HARQ process having a period of 10 ms is proposed to improve the third embodiment where only six HARQ processes can be used, which will be explained in more details.

The base station 200 transmits, on the $n^{th}$ DL subframe (e.g., the $1^{st}$ subframe of frame 0 of FIG. 10), backhaul data (e.g., a grant message with respect to request for UL resources by the relay station, or ACK/NACK).

Then, the relay station 300 transmits, on the $(n+k)^{th}$ UL subframe, data (e.g., including ACK/NACK) corresponding to the data received on the $n^{th}$ DL subframe. Here, the value of said k is determined by the value of said n. More concretely, the k may be variable according to an index of the n in the following Table 1. That is, as shown in the following Table 1, the value of said k may be determined by the value of the n, and according to whether a corresponding subframe is an even or odd-numbered subframe.

Upon receipt of the data from the relay station on the $(n+k)^{th}$ subframe, the base station 200 transmits, on the $(n+10)^{th}$ DL subframe (the $1^{st}$ subframe of frame 1), data corresponding to the received data (e.g., retransmits the previously-transmitted data, or transmits ACK/NACK or a grant message).

TABLE 1

| | Subframe (n) | | | | | |
|---|---|---|---|---|---|---|
| | 1 | 2 | 3 | 6 | 7 | 8 |
| UL Transmission Timing (k) | When a UL subframe for a process is even-numbered, 3 When a UL subframe for a process is odd-numbered, 4 | 4 | When a UL subframe for a process is odd-numbered, 4 When a UL subframe for a process is even-numbered, 5 | When a UL subframe for a process is odd-numbered, 3 When a UL subframe for a process is even-numbered, 4 | 4 | When a UL subframe for a process is even-numbered, 4 When a UL subframe for a process is odd-numbered, 5 |

As shown in Table 1, the $n^{th}$ subframe in one downlink may include a plurality of corresponding $(n+k)^{th}$ UL subframes.

For instance, in the case that the base station 200 has transmitted data to the relay station 300 on the $1^{st}$ DL subframe, the value of said k is 3 or 4 when the value of said n is 1 as shown in Table 1. Accordingly, the relay station 300 may transmit data corresponding to the received data, on the $4^{th}$ subframe corresponding to the (n+3) (in case of an even-numbered UL subframe for a process), or on the $5^{th}$ subframe corresponding to the (n+4) (in case of an odd-numbered UL subframe for a process).

A control signal indicating whether the relay station 300 operates a HARQ process on the even-numbered subframe or on the odd-numbered subframe may be received by the relay station 300 from the base station 200 in the downlink. The control signal may be received on a control channel. The control signal may be included in a physical control channel, e.g., R-PDCCH (relay physical downlink control channel). The R-PDCCH is used to transmit scheduling information, and includes therein at least one of an identifier, resource assignment, duration of assignment, a transmission parameter (e.g., modulation scheme, payload size, MIMO-related information), a redundancy version, a new data indicator and HARQ process information. The HARQ process information may include information indicating an even-number or an odd-number. Alternatively, the control information may be a specific bit in a DL control channel (CDI) of the R-PDCCH.

For instance, in the case that the relay station 300 has received the R-PDCCH having a bit of 0, the relay station 300 may recognize that itself has to operate a process using an even-numbered subframe. More concretely, when the relay station 300 has received, on the $1^{st}$ subframe (n=1), the R-PDCCH having a bit of 0 which indicates a process using an even-numbered subframe, the relay station 300 may check, from Table 1, that the value of said n is 1, and the value of said k corresponding to the even-numbered subframe is 3. Then, the relay station 300 may transmit corresponding data on the $4^{th}$ subframe.

Information on whether the relay station 300 has to operate a process using the even-numbered subframe or a process using the odd-numbered subframe may be indicated by a signal transmitted from an upper layer.

The ten subframes shown in FIG. 12 may be divided into two subsets as shown in FIG. 13 for prevention of collisions between HARQ processes having a period of 8 ms in the uplink from the terminal to the relay station 300. The first subset includes five processes (A, C, E, G and I) which occupy the even-numbered UL subframes, and the second subset includes five processes (B, D, F, H and J) which occupy the odd-numbered UL subframes.

In order to prevent collisions between HARQ processes having a period of 8 ms in the uplink from the terminal to the relay station 300, backhaul data between the relay station 300 and the base station 200 is configured to use one of the two subsets. For instance, when the terminal uses the odd-numbered UL subframes, the relay station 300 is set to use the even-numbered UL subframes for prevention of collisions, and vice versa.

The relay station 300 may set one of the two subsets, through control information transmitted from an upper layer.

As can be seen from Table 1 and FIGS. 12 and 13, three different time intervals (3 ms, 4 ms and 5 ms) exist between the UL subframe and the DL subframe. More concretely, six processes (A, B, C, E, G and H) have a time interval of 4 ms, two processes (D and I) have a time interval of 5 ms, and two processes (F and J) have a time interval of 3 ms.

However, as aforementioned, the time interval of 3 ms may not be sufficient in decoding data. Especially, when a process performance of the relay station 300 is not sufficient, or when the amount of data to be transmitted and received is great, the time interval of 3 ms may not be sufficient in decoding data. Accordingly, it is preferable not to use the processes having the time interval of 3 ms.

When the two processes having the time interval of 3 ms (i.e., F and J processes) are not used, Table 1 may be modified into the following Table 2.

TABLE 2

| | Subframe (n) | | | | | |
|---|---|---|---|---|---|---|
| | 1 | 2 | 3 | 6 | 7 | 8 |
| UL Transmission Timing (k) | 4 | 4 | When a UL subframe for a process is odd-numbered, 4 When a UL subframe for a process is even-numbered, 5 | 4 | 4 | When a UL subframe for a process is even-numbered, 4 When a UL subframe for a process is odd-numbered, 5 |

The above Table 2 illustrates eight processes totally. The eight processes may be indicated by three bits of a control signal. Accordingly, the number of bits may be reduced by one bit when compared to four bits required to indicate ten processes. This may reduce the amount of overhead of the control signal.

Figure 14:
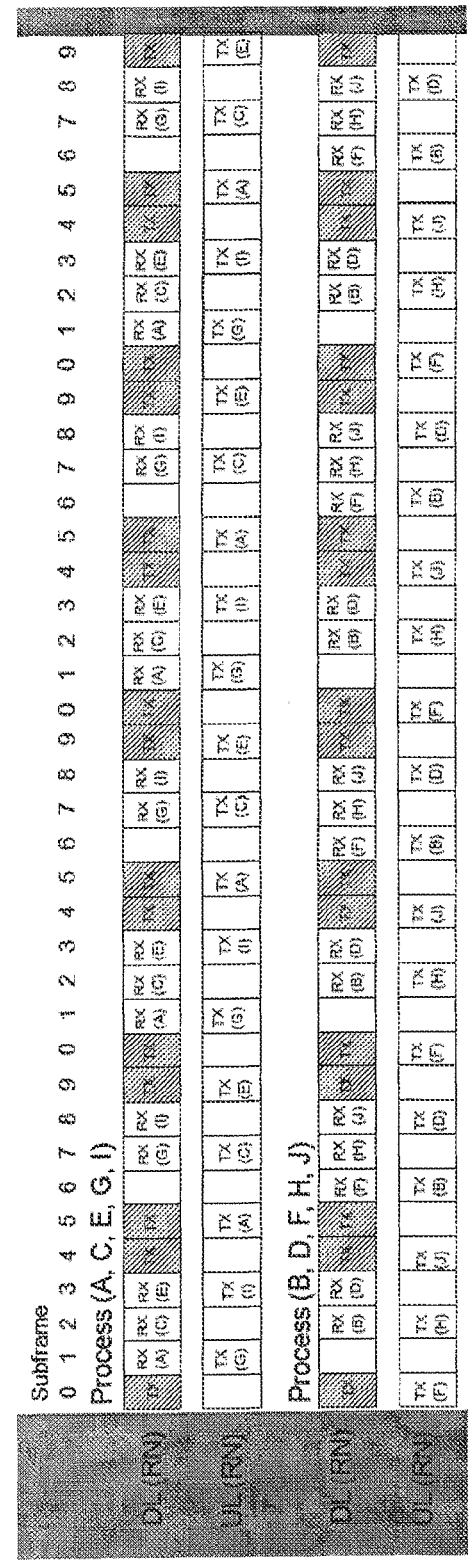
FIG. 14 illustrates HARQ processes which can be used without collisions according to a fifth embodiment of the present invention.

FIG. 14 illustrates HARQ processes which can be used without collisions according to a fifth embodiment of the present invention.

In the fifth embodiment, as shown in FIG. 8, a HARQ process for backhaul data has a period of 10 ms, and a time interval between the UL subframe and the DL subframe is in the range of 4 ms~6 ms. By the maximum interval, the relay station 300 may have a sufficient decoding time.

This will be explained in more details.

The base station 200 transmits, on the $n^{th}$ DL subframe (e.g., the $1^{st}$ subframe of frame 0 of FIG. 10), backhaul data (e.g., a grant message with respect to request for UL resources by the relay station, or ACK/NACK).

Then, the relay station 300 transmits, on the $(n+k)^{th}$ UL subframe, data (e.g., including ACK/NACK) corresponding to the data received on the $n^{th}$ DL subframe. Here, the value of said k may be determined by the value of the n, and according to whether a corresponding subframe is an even or odd-numbered subframe.

TABLE 3

| | Subframe (n) | | | | | |
|---|---|---|---|---|---|---|
| | 1 | 2 | 3 | 6 | 7 | 8 |
| UL Transmission Timing (k) | 4 | When a UL subframe for a process is even-numbered, 4 When a UL subframe for a process is odd-numbered, 5 | When a UL subframe for a process is even-numbered, 5 When a UL subframe for a process is odd-numbered, 6 | 4 | When a UL subframe for a process is odd-numbered, 4 When a UL subframe for a process is even-numbered, 5 | When a UL subframe for a process is odd-numbered, 5 When a UL subframe for a process is even-numbered, 6 |

For instance, in the case that the base station 200 has transmitted data to the relay station 300 on the $2^{nd}$ DL subframe, as shown from Table 3, the value of said k is 4 or 5 when the value of said n is 2. Accordingly, the relay station 300 may transmit data corresponding to the received data, on the $6^{th}$ subframe corresponding to the (n+4) (in case of an even-numbered UL subframe for a process), or on the $7^{th}$ subframe corresponding to the (n+5) (in case of an odd-numbered UL subframe for a process).

A control signal indicating whether the relay station 300 is operated on the even-numbered subframe for a process ('B' process of FIG. 14) or the odd-numbered subframe for a process ('C' process of FIG. 14) may be received in the downlink from the base station 200 to the relay station 300.

Alternatively, the information indicating whether the relay station 300 is operated on the even-numbered subframe for a process or the odd-numbered subframe for a process may be set to be indicated by an upper layer.

By using one of the even-numbered subframes and the odd-numbered subframes, a HARQ process for the terminal and a HARQ process for backhaul data may be performed without collisions.

Figure 15:
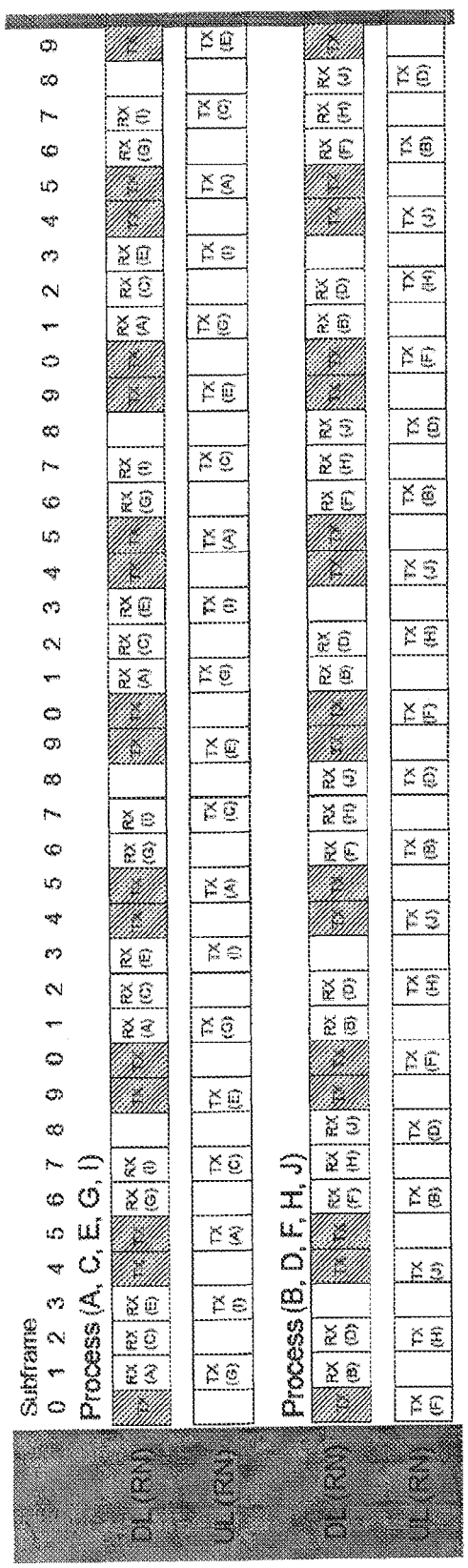
FIG. 15 illustrates HARQ processes which can be used without collisions according to a sixth embodiment of the present invention.

FIG. 15 illustrates HARQ processes which can be used without collisions according to a sixth embodiment of the present invention.

In the sixth embodiment, like in the fifth embodiment of FIG. 14, a time interval between the UL subframe and the DL subframe is in the range of 4 ms~6 ms.

In the sixth embodiment, the value of said k may be determined by the value of said n, and based on the following Table 4.

TABLE 4

| | Subframe (n) | | | | |
|---|---|---|---|---|---|
| | 1 | 2 | 3 | 6 | 7 | 8 |
| UL Transmission Timing (k) | When a UL subframe for a process is odd-numbered, 4 When a UL subframe for a process is even-numbered, 5 | When a UL subframe for a process is odd-numbered, 5 When a UL subframe for a process is even-numbered, 6 | 6 | When a UL subframe for a process is even-numbered, 4 When a UL subframe for a process is odd-numbered, 5 | When a UL subframe for a process is even-numbered, 5 When a UL subframe for a process is odd-numbered, 6 | 6 |

For instance, in the case that the base station 200 has transmitted data to the relay station 300 on the $2^{nd}$ DL subframe, as shown from Table 3, the value of said k is 5 or 6 when the value of said n is 2. Accordingly, the relay station 300 may transmit data corresponding to the received data, on the $7^{th}$ subframe corresponding to the (n+5) (in case of an odd-numbered UL subframe for a process), or on the $8^{th}$ subframe corresponding to the (n+6) (in case of an even-numbered UL subframe for a process).

A control signal indicating whether the relay station 300 is operated on the even-numbered subframe for a process ('C' process of FIG. 15) or the odd-numbered subframe for a process ('D' process of FIG. 15) may be received in the downlink from the base station 200 to the relay station 300.

Alternatively, the information indicating whether the relay station 300 is operated on the even-numbered subframe for a process or the odd-numbered subframe for a process may be set to be indicated by an upper layer.

Figure 16:
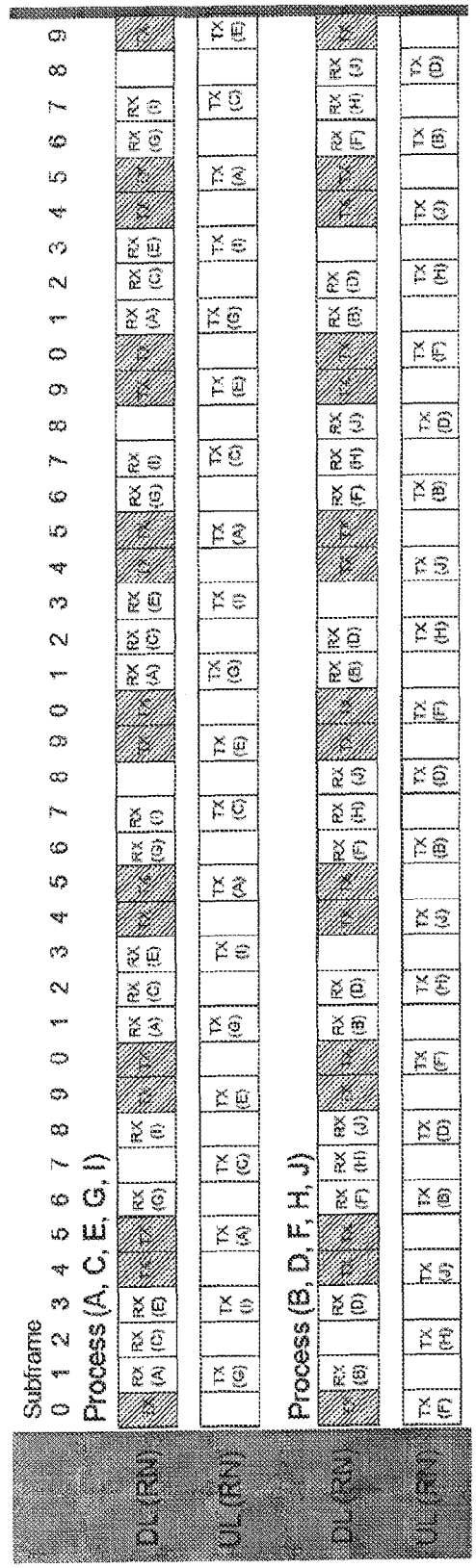
FIG. 16 illustrates HARQ processes which can be used without collisions according to a seventh embodiment of the present invention.

FIG. 16 illustrates HARQ processes which can be used without collisions according to a seventh embodiment of the present invention.

In the seventh embodiment, like in the fifth embodiment of FIG. 14 and the sixth embodiment of FIG. 15, a time interval between the UL subframe and the DL subframe is in the range of 4 ms~6 ms.

In the seventh embodiment, the value of said k may be determined by the value of said n, and based on the following Table 5.

TABLE 5

| | Subframe (n) | | | | | |
|---|---|---|---|---|---|---|
| | 1 | 2 | 3 | 6 | 7 | 8 |
| UL Transmission Timing (k) | When a UL subframe for a process is odd-numbered, 4 When a UL subframe for a process is even-numbered | 5 When a UL subframe for a process is even-numbered, 5 When a UL subframe for a process is odd-numbered, 6 | When a UL subframe for a process is even-numbered, 4 When a UL subframe for a process is odd-numbered, 5 | 5 | When a UL subframe for a process is even-numbered, 5 When a UL subframe for a process is odd-numbered, 6 | When a UL subframe for a process is odd-numbered, 5 When a UL subframe for a process is even-numbered, 6 |

For instance, in the case that the base station 200 has transmitted data to the relay station 300 on the $3^{rd}$ DL subframe, as shown from Table 4, the value of said k is 5 or 6 when the value of said n is 3. Accordingly, the relay station 300 may transmit data corresponding to the received data, on the $8^{th}$ subframe corresponding to the (n+5) (in case of an even-numbered UL subframe for a process), or on the $9^{th}$ subframe corresponding to the (n+6) (in case of an odd-numbered UL subframe for a process).

A control signal indicating whether the relay station 300 is operated on the even-numbered subframe for a process ('D' process of FIG. 16) or the odd-numbered subframe for a process ('E' process of FIG. 15) may be received in the downlink from the base station 200 to the relay station 300.

Alternatively, the information indicating whether the relay station 300 is operated on the even-numbered subframe for a process or the odd-numbered subframe for a process may be set to be indicated by an upper layer.

The aforementioned embodiments may be combined with each other. For instance, the first and second embodiments may be combined with each other. Alternatively, the second and third embodiments may be combined with each other. However, the present invention is not limited to this, but the embodiments of the present invention may be combined with each other in various manners.

In addition, the above various embodiments may be implemented by using, computer software, hardware, or some combination thereof. For instance, the method of the present invention may be stored in a storage medium (e.g., volatile memory, non-volatile memory (e.g., flash memory), hard disc, etc.), or may be implemented in codes or commands inside a software program that can be executed by a processor.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for transmitting and receiving data, the method performed by a relay node and comprising:
   receiving, by the relay node from a base station, a downlink data in a subframe n−k,
   wherein the subframe n−k is configured as a multicast broadcast single frequency network (MBSFN) subframe by the relay node; and
   transmitting, by the relay node to the base station, in response to receiving the downlink data in the subframe n−k, an acknowledgement (ACK)/negative acknowledgement (NACK) in an uplink subframe n,
   wherein n is an index number of the uplink subframe for transmitting the ACK/NACK,
   wherein a value of n is associated with a parameter indicating a subframe configuration related with at least one hybrid automatic repeat request (HARQ) process between the relay node and the base station, and
   wherein the value of k is equal to or greater than 4.

2. The method of claim 1,
   wherein the subframe n−k is configured to exclude any subframes that are not configurable as the MBSFN subframe by the relay node.

3. The method of claim 1, further comprising:
   receiving a relay physical downlink control channel (R-PDCCH).

4. A relay node for transmitting and receiving data, the relay node comprising:
   a radio frequency (RF) unit; and
   a processor,
   wherein the processor is configured to
   receive a downlink data in a subframe n−k,
   wherein the subframe n−k is configured as a multicast broadcast single frequency network (MBSFN) subframe by the relay node, and
   transmit, in response to receiving the downlink data in the subframe n−k, an acknowledgement (ACK)/negative acknowledgement (NACK) in an uplink subframe n,
   wherein n is an index number of the uplink subframe for transmitting the ACK/NACK,
   wherein a value of n is associated with a parameter indicating a subframe configuration related with at least one hybrid automatic repeat request (HARQ) process between the relay node and the base station, and
   wherein the value of k is equal to or greater than 4.

5. The relay node of claim 4,
   wherein the subframe n−k is configured to exclude any subframes that are not configurable as the MBSFN subframe by the relay node.

6. The relay node of claim 4,
   wherein the processor is further configured to receive a relay physical downlink control channel (R-PDCCH).

* * * * *